(12) United States Patent
Truong et al.

(10) Patent No.: US 11,972,765 B2
(45) Date of Patent: *Apr. 30, 2024

(54) SYSTEMS AND METHODS FOR PARTY AUTHENTICATION AND INFORMATION CONTROL DURING VIDEO CALLS WITH A SERVER CONTROLLING THE AUTHENTICATION AND FLOW OF INFORMATION BETWEEN PARTIES WHOSE IDENTITIES ARE NOT REVEALED TO EACH OTHER

(71) Applicant: Capital One Services, LLC, McLean, VA (US)

(72) Inventors: Anh Truong, Champaign, IL (US); Reza Farivar, Champaign, IL (US); Vincent Pham, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 82 days.

This patent is subject to a terminal disclaimer.

(21) Appl. No.: 17/481,134

(22) Filed: Sep. 21, 2021

(65) Prior Publication Data
US 2022/0005480 A1 Jan. 6, 2022

Related U.S. Application Data

(63) Continuation of application No. 16/807,465, filed on Mar. 3, 2020, now Pat. No. 11,170,784.

(51) Int. Cl.
*G10L 17/00* (2013.01)
*G06F 16/23* (2019.01)
(Continued)

(52) U.S. Cl.
CPC .......... *G10L 17/00* (2013.01); *G06F 16/2379* (2019.01); *G06N 5/04* (2013.01);
(Continued)

(58) Field of Classification Search
CPC ........ H04N 7/147; G10L 15/26; G06Q 10/10; G06Q 30/02; H04L 51/32; G06N 5/04
See application file for complete search history.

(56) References Cited

U.S. PATENT DOCUMENTS 6,477,240 B1 11/2002 Lim et al.
6,574,599 B1 6/2003 Lim et al.
(Continued)

FOREIGN PATENT DOCUMENTS

AU 2012201411 A1 3/2012
CA 2613363 A1 1/2007
(Continued)

*Primary Examiner* — Farzad Kazeminezhad
(74) *Attorney, Agent, or Firm* — HUNTON ANDREWS KURTH LLP

(57) ABSTRACT

Example embodiments of systems and methods for providing a video call between a first party and a second party. The method includes detecting an attempt to establish the video call by monitoring a voice call between the first party and the second party; authenticating the first and second parties; receiving from the first and second parties respective voice acceptances to invitations to establish the video call; retrieving video call identifications of the first and second parties; and establishing the video call without revealing the video call identification of the first party to the second party and the video call identification of the second party to the first party. A server uses credentials of a first party to request if that party would allow access of his identifying information to a second party and use that credential to further authenticate the first party.

20 Claims, 7 Drawing Sheets

(51) Int. Cl.
*G06N 5/04* (2023.01)
*G06N 20/00* (2019.01)
*G06Q 10/10* (2023.01)
*G06Q 30/02* (2023.01)
*G10L 15/26* (2006.01)
*G10L 17/06* (2013.01)
*G10L 17/22* (2013.01)
*G10L 25/90* (2013.01)
*H04L 9/40* (2022.01)
*H04L 12/58* (2006.01)
*H04L 65/1069* (2022.01)
*H04N 7/14* (2006.01)

(52) U.S. Cl.
CPC .............. *G06N 20/00* (2019.01); *G10L 17/06* (2013.01); *G10L 17/22* (2013.01); *G10L 25/90* (2013.01); *H04L 63/0861* (2013.01); *H04L 65/1069* (2013.01); *H04N 7/147* (2013.01); *G06Q 30/02* (2013.01)

(56) References Cited

U.S. PATENT DOCUMENTS

| | | | |
|---|---|---|---|
| 8,265,253 | B2 | 9/2012 | D'Amora et al. |
| 9,532,004 | B1 | 12/2016 | Metter et al. |
| 11,170,784 | B2 * | 11/2021 | Truong .................. G06N 5/04 |
| 2002/0034281 | A1 | 3/2002 | Isaacs et al. |
| 2008/0167011 | A1 | 7/2008 | Novick et al. |
| 2008/0167012 | A1 | 7/2008 | Novick et al. |
| 2008/0167013 | A1 | 7/2008 | Novick et al. |
| 2008/0285731 | A1 | 11/2008 | Mykhalchuk et al. |
| 2009/0043856 | A1 | 2/2009 | Darby |
| 2009/0135741 | A1 | 5/2009 | Mykhalchuk et al. |
| 2009/0147931 | A1 | 6/2009 | Gartner |
| 2011/0077947 | A1 | 3/2011 | Beauregard et al. |
| 2011/0202350 | A1 | 8/2011 | Barnes |
| 2012/0278388 | A1 | 11/2012 | Kleinbart et al. |
| 2013/0297689 | A1 | 11/2013 | Bhat et al. |
| 2014/0108152 | A1 | 4/2014 | Wu et al. |
| 2014/0237564 | A1 | 8/2014 | Dudziak et al. |
| 2016/0284354 | A1 | 9/2016 | Chen et al. |
| 2017/0230491 | A1 | 8/2017 | Hillier et al. |
| 2018/0227424 | A1 | 8/2018 | Dorsey et al. |

FOREIGN PATENT DOCUMENTS

| | | |
|---|---|---|
| CA | 2639501 A1 | 3/2010 |
| EP | 1602051 A2 | 12/2005 |
| EP | 2683149 A1 | 1/2014 |
| EP | 2649785 B1 | 3/2017 |
| WO | 2005013596 A1 | 2/2005 |
| WO | 2005055570 A1 | 6/2005 |
| WO | 2009029328 A1 | 3/2009 |
| WO | 2011063387 A2 | 5/2011 |
| WO | 2019079269 A1 | 4/2019 |

* cited by examiner

SYSTEMS AND METHODS FOR PARTY AUTHENTICATION AND INFORMATION CONTROL DURING VIDEO CALLS WITH A SERVER CONTROLLING THE AUTHENTICATION AND FLOW OF INFORMATION BETWEEN PARTIES WHOSE IDENTITIES ARE NOT REVEALED TO EACH OTHER

CROSS-REFERENCE TO RELATED APPLICATION

The subject application is a continuation of U.S. patent application Ser. No. 16/807,465, filed Mar. 3, 2020, the complete disclosure of which is incorporated herein by reference in its entirety.

FIELD OF THE INVENTION

The present disclosure relates generally to video call, and more particularly, to systems and methods for providing a video call without revealing video call identifications of call parties.

BACKGROUND

When customers make service calls to an agent (e.g., to a call center, a customer service center, a customer service agent, or technical support) for product or service issues, the call can often benefit from showing a picture and/or other image (e.g., a receipt, a confirmation email, a bar code, product information, etc.). Currently, to show pictures and/or images to an agent, a customer usually sends the pictures and/or images over email before making a service call or during the service call and waits for a certain amount of time when the call center agent looks up that email. This can waste time and is inconvenient for both the customer and the call center agent.

These and other deficiencies exist. Accordingly, there is a need to provide system and method solutions that overcome these deficiencies to increase the quality and satisfaction of customer services at call centers.

SUMMARY

Aspects of the disclosed technology include systems and methods for providing a video call between a first party and a second party without revealing a call identification of the fist party to the second party and without revealing a call identification of the second party to the first party. Various embodiments describe systems and methods for implementing and managing the video call.

Embodiments of the present disclosure provide a system for providing a video call between a first party and a second party. The system can comprise a database storing voice biometrics data of the first party and the second party; and a server in data communication with the database and a voice identity recognition tool. The server can be configured to: monitor a voice call between the first party and the second party; detect, using the voice identity recognition tool, voice information from the voice call indicative of an attempt to establish the video call; upon detecting the voice information, authenticate using the voice identity recognition tool and based on the voice biometrics data, the first party and the second party; upon authenticating the first party, transmit to the first party a first voice invitation to establish the one-time video call; receive from the first party a first voice acceptance to the first voice invitation; upon authenticating the second party, transmit to the second party a second voice invitation to establish the one-time video call; receive from the second party a second voice acceptance to the second voice invitation; responsive to the first voice acceptance and the second voice acceptance, retrieve a video call identification of the first party and a video call identification of the second party; and based on the video call identification of the first party and the video call identification of the second party, establish the video call between the first party using a first video call application and the second party using a second video call application, wherein the video call is established without revealing the video call identification of the first party to the second party and without revealing the video call identification of the second party to the first party.

Embodiments of the present disclosure provide a method for providing a video call between a first party and a second party without revealing a video call identification of the first party to the second party and a video call identification of the second party to the first party. The method can comprise: monitoring, using a voice identity recognition tool, a voice call between the first party and the second party; detecting, using the voice identity recognition tool in the server, voice information from the voice call indicative of an attempt to establish the video call; upon detecting the information, authenticating from the voice call, using the voice identity recognition tool in the server and based on voice biometrics data of the first and second parties stored in a database, the first party and the second party; upon authenticating the first party, transmitting, using the voice identity recognition tool in the server, to the first party a first voice invitation to establish the video call; receiving from the first party, using the voice identity recognition tool in the server, a first voice acceptance to the first voice invitation; upon authenticating the second party, transmitting, using the voice identity recognition tool in the server, to the second party a second voice invitation to establish the video call; receiving from the second party, using the voice identity recognition tool in the server, a second voice acceptance to the second voice invitation; responsive to the first voice acceptance and the second voice acceptance, retrieving the video call identification of the first party and the video call identification of the second party; and based on the video call identification of the first party and the video call identification of the second party, establishing without revealing the video call identification of the first party to the second party and the video call identification of the second party to the first party, the video call between the first party using a first video call application and the second party using a second video call application.

Embodiments of the present disclosure provide a non-transitory computer-accessible medium having stored thereon computer-executable instructions for providing a video call between a first party and a second party, wherein, when a computer arrangement executes the instructions, the computer arrangement comprising a processor in data communication with a database containing voice biometrics data of the first party and second party. The computer arrangement is configured to perform procedures comprising: monitoring, using a voice identity recognition tool, a voice call between the first party and the second party; detecting, using the voice identity recognition tool, voice information from the voice call indicative of an attempt to establish the video call; upon detecting the information, authenticating from the voice call, using the voice identity recognition tool and based on the voice biometrics data, the first party and the second party; upon authenticating the first party, transmitting, using the voice identity recognition tool, to the first party a first voice invitation to establish the video call; receiving from the first party, using the voice identity recognition tool, a first voice acceptance to the first voice invitation; upon authenticating the second party, transmitting, using the voice identity recognition tool, to the second party a second voice invitation to establish the video call; receiving from the second party, using the voice identity recognition tool, a second voice acceptance to the second voice invitation; responsive to the first voice acceptance and the second voice acceptance, retrieving a video call identification of the first party and a video call identification of the second party; and based on the video call identification of the first party and the video call identification of the second party, establishing the video call between the first party using a first video call application and the second party using a second video call application, wherein the video call is established without revealing the video call identification of the first party to the second party and without revealing the video call identification of the second party to the first party.

Further features of the disclosed systems and methods, and the advantages offered thereby, are explained in greater detail hereinafter with reference to specific example embodiments illustrated in the accompanying drawings.

DETAILED DESCRIPTION OF EXAMPLE EMBODIMENTS

Figure 1:
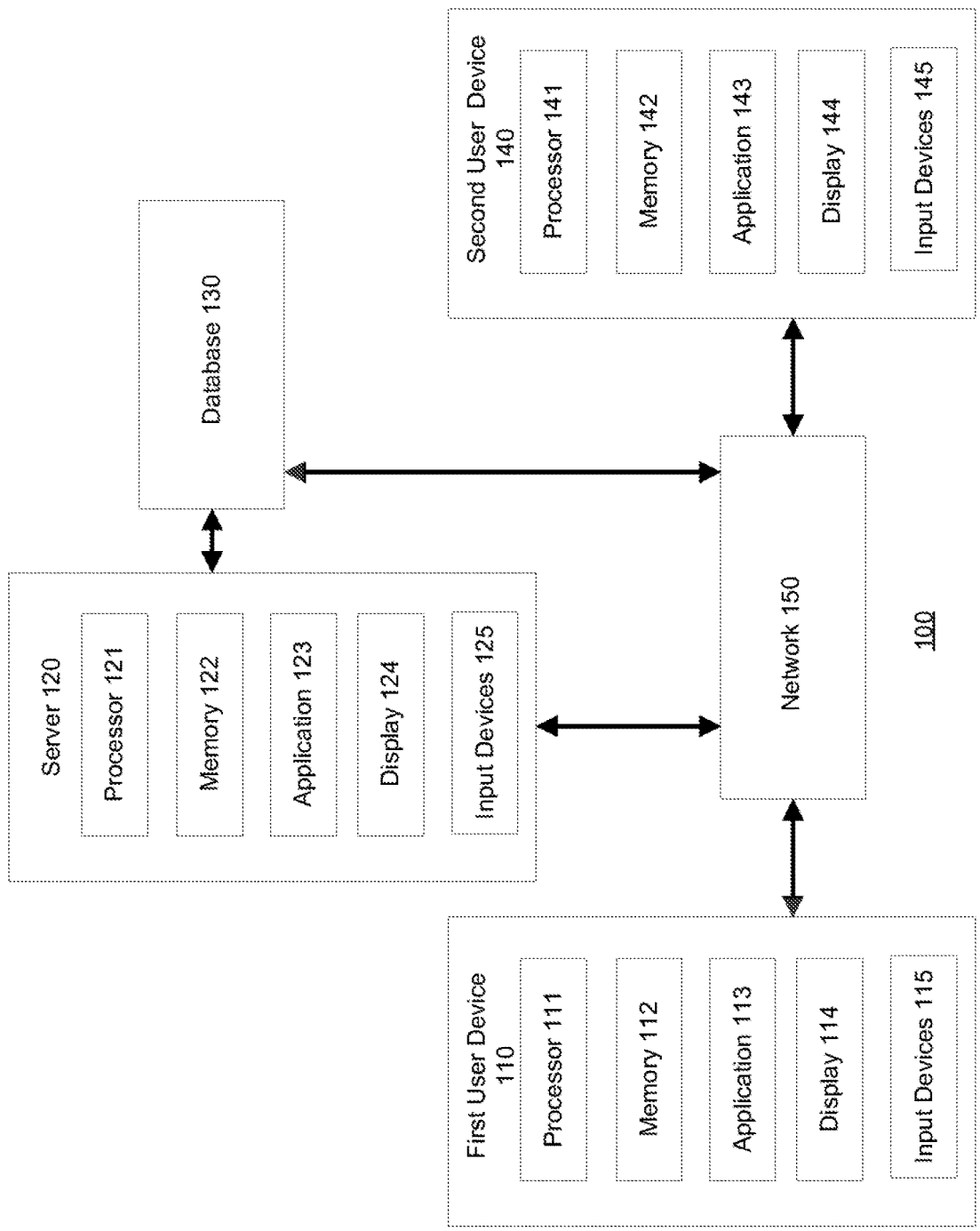
FIG. 1 is a diagram of a system for providing a video call without revealing video call identifications of parties according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Example embodiments of the present disclosure provide systems and methods for providing a video call between a first party and a second party without revealing to each other their video call identifications. The video call can occur between a customer and an agent. As used herein, an agent includes, without limitation, a call center, a customer service center, technical support, a merchant (e.g., a retail store), and other customer-facing businesses and employees thereof. For the purpose of illustration, customer service call centers are discussed herein as examples, but it is understood that the present disclosure is not limited thereto. The first party can be a customer and the second party can be a customer service agent of a customer service center. However, one skilled in the art would understand that the discussion applies equally to a wider variety of other situations. For instance, the systems and methods disclosed herein can used for the online purchasing systems where people want to see the real video/photo of the items for sale. As another example, a video call can be useful for technical support, such as assistance with assembly or a product or troubleshooting a malfunctioning product. The use of call centers is not intended to be limiting. In addition, example embodiments include calls conducted entirely telephonically, as well as video calls.

When a customer makes a voice phone call to a customer service center where the voice phone call may be forwarded and assigned to a customer service agent, either the customer or the customer service agent may express an attempt during the voice phone call to expand more details to have issues solved. For example, the customer may want to or the customer service agent may request the customer to show pictures of a bar code of purchased item, text details in a confirmation email showing the amount of transaction through the receipt, pictures of damages to a purchased item, an assembling process of a toy, and the like. However, it is difficult to show these pictures and explain those things over the voice phone call. A video call (e.g., a one-time video call) between the customer and the customer service agent can facilitate such situations.

The systems disclosed herein can automatically detect the attempt of establishing a video call between the customer service agent and the customer. Upon detecting the attempt, the system can check the identities of both the customer service agent and the customer to authenticate them. Upon authentication, the systems can automatically obtain the video call identifications of both the customer service agent and the customer to make the video call connection. Unlike making a video call between people in existing technology where calling parties need to know each other's video call identifications, the systems disclosed herein are able to establish the video call between the customer service agent and the customer without revealing to each other the video call identifications of the customer service agent and the customer. In addition to the video call identifications, other personal and private information (e.g., names, addresses, account numbers, account information, payment/financial information, and other sensitive information) may also be protected. The exposure of such information can be reduced and can only occur with the customer's approval. In some examples discussed herein, the exposure of such information can occur in one or more steps, and additional steps and approvals can be required in order to reveal additional private information. In this manner, both the customer service agent and the customer can feel more comfortable in making the video call. In addition, the risk of data exposure to identity thieves or other fraudulent actors can be reduced.

In addition to facilitating the process and making it easier for the customer as well as the customer service agents, the systems can improve the efficiency of customer calls, and the customer experience on these calls. Identification and verification processes can be time consuming and degrade the customer experience, making the customers hesitant to place the call for customer support. Improving this process and the customer experience can improve business/customer interactions and give a business a better sense of their customers. Accordingly, personal interactions between businesses and customers can be increased, to the benefit of both businesses and customers.

Authentication of the customer service agent and the customer may be performed using a voice identity recognition tool of the system. The voice identity recognition tool can use voice profiles or voice biometrics data of the customer service agent and the customer stored in a database to identify and authenticate them. The voice profiles can include voice patterns of the customer service agent and the customer in terms of the voice magnitude and frequency range as well as voice accent. The voice profiles can be used to train the machine learning (ML) algorithms and/or natural language processing (NLP) algorithms to associate voice characteristics with the customer and the customer service agent. By comparing the observed voice characteristics and the voice profiles, the customer and the customer service agent can be identified and authenticated.

The voice profiles may be built based on the previous history of phone calls. For example, the customer may have made one or more phone calls previously to the customer service center. The voice data of those phone calls can be stored in the database and used to train the ML models and/or the NLP algorithm to link the customer to voice characteristics extracted from the voice data. The voice characteristics may also be linked to an account number of the customer. For example, the voice data of the phone calls may contain name, account number, phone number, and the like of the customer, which can be extracted through NLP and linked to the voice characteristics. The next time the customer calls in to the customer service center, the customer can be identified and authenticated by comparing the voice characteristics in the phone call with the voice characteristics stored in the database. Similarly, this can also be done for the customer service agent.

Upon authentication, the systems are configured to request acceptance from the customer and the customer service agent to make the connection of video call. The acceptance can be done by a voice identity recognition tool using natural language processing (NLP). For example, the system may send a voice invitation to the customer service agent, e.g., "would you like to accept a one-time video call connection?", and the customer service agent can give a verbal acceptance that can be recognized by the system. Similarly this can be performed to the customer.

The system can automatically obtain the video call identifications of the customer and the customer service agent from a video call application. The video call connection can be automatically established by the system based on the video call identifications, such that the video call identification of the customer is not revealed to the customer service agent, and vice versa. That is, unlike conventional video call technologies, in the present disclosure the customer does not need to know the video call identification of the customer service agent, and the customer service agent does not need to know the video call identification of the customer service either.

FIG. 1 illustrates a system 100 for providing a video call without revealing video call identifications of parties according to an example embodiment. As further discussed below, the system 100 may include a first user device 110, a server device 120, a database 130, and a second user device 140 in communication using a network 150. Although FIG. 1 illustrates single instances of the components, the system 100 may include any number of components.

The first user device 110 and second user device 140 may each be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The first user device 110 and second user device 140 may respectively include a processor 111 and 141, a memory 112 and 142, an application 113 and 143, a display 114 and 144, and input devices 115 and 145. The processor 111 and 141 may be a processor, a microprocessor, or other processor, and the first user device 110 and second user device 140 may each include one or more of these processors. The processor 111 and 141 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 and 141 may be coupled to the memory 112 and 142, respectively. The memory 112 and 142 may each be a read-only memory, write-once read-multiple memory or read/write memory, e.g., RAM, ROM, and EEPROM, and the first user device 110 and second user device 140 may each include one or more of these memories. A read-only memory may be factory programmable as read-only or one-time programmable. One-time programmability provides the opportunity to write once then read many times. A write-once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times. The memory 112 and 142 may each be configured to store one or more software applications, such as application 113 and 143 respectively, and other data, such as private and personal information.

The application 113 and 143 may each comprise one or more software applications comprising instructions for execution on the first user device 110 and second user device 140 respectively. In some examples, the first user device 110 and second user device 140 may each execute one or more applications, such as software applications, that enable, for example, network communications with one or more components of the system 100, transmit and/or receive data, and perform the functions described herein such as video calls. Upon execution by the processor 111 and 141 respectively, the application 113 and 143 may each provide the functions described in this specification, specifically to execute and perform the steps and functions in the process flows described below. Such processes may be implemented in software, such as software modules, for execution by computers or other machines. The application 113 and 143 may each provide graphic user interfaces (GUIs) through which users may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The first user device 110 and second user device 140 may respectively further include a display 114 and 144 and input devices 115 and 145. The display 114 and 144 may each be any type of device for presenting visual information such as a computer monitor, a flat panel display, and a mobile device screen, including liquid crystal displays, light-emitting diode displays, plasma panels, and cathode ray tube displays. The input devices 115 and 145 may each include any device for entering information into the first user device 110 and second user device 140 respectively that is available and supported by the first user device 110 and second user device 140 respectively, such as a touch-screen, keyboard, mouse, cursor-control device, touch-screen, microphone, digital camera, video recorder or camcorder. These devices may be used to enter information and interact with the software and other devices described herein such as making video calls.

The server 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 120 may include a processor 121, a memory 122, and an application 123. The processor 121 may be a processor, a microprocessor, or other processor, and the server 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and user deice may include one or more of these memories. A read-only memory may be factory programmable as read-only or one-time programmable. One-time programmability provides the opportunity to write once then read many times. A write-once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 122, and other data, such as customer's shopping and financial account information.

The application 123 may comprise one or more software applications comprising instructions for execution on the server 120. In some examples, the server 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. For example, the application 123 may include NLP algorithms to perform voice recognition, and machining learning (ML) models to identify customers and customer service agents based on voice biometrics data. Such processes may be implemented in software, such as software modules, for execution by computers or other machines. The application 123 may provide graphic user interfaces (GUIs) through which user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the server 120 that is available and supported by the server 120, such as a touch-screen, keyboard, mouse, cursor-control device, touch-screen, microphone, digital camera, video recorder or camcorder. These devices may be used to enter information and interact with the software and other devices described herein.

The database 130 may be one or more databases configured to store date, including without limitation, private information of customers and customer service agents, video call identifications of customers and customer service agents. The database 130 may comprise a relational database, a non-relational database, or other database implementations, and any combination thereof, including a plurality of relational databases and non-relational databases. In some examples, the database 130 may comprise a desktop database, a mobile database, or an in-memory database. Further, the database 130 may be hosted internally by the server 120 or may be hosted externally of the server 120, such as by a server, by a cloud-based platform, or in any storage device that is in data communication with the server 120.

The system 100 may include one or more networks 150. In some examples, the network 150 may be one or more of a wireless network, a wired network or any combination of wireless network and wired network, and may be configured to connect the first user device 110, the server 120, the database 130, and the second user device 140. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the first user device 110, server 120, and second user device 140 using network 150 can occur using one or more front channels and one or more secure back channels. A front channel may be a communication protocol that employs a publicly accessible and/or unsecured communication channel such that a communication sent to the first user device 110, server 120, and/or second user device 140 may originate from any other device, whether known or unknown to the first user device 110, server 120, and/or the second user device 140, if that device possesses the address (e.g., network address, Internet Protocol (IP) address) of the first user device 110, server 120, and/or the second user device 140. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the first user device 110, server 120, and/or the second user device 140 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

In some examples, the first user device 110 can be associated with a user and may be operated by that user, such as a customer. The server 120 can be associated with customer service call centers. The second user device 140 can be associated with a user and may be operated by that user, such as a customer service agent.

Figure 2:
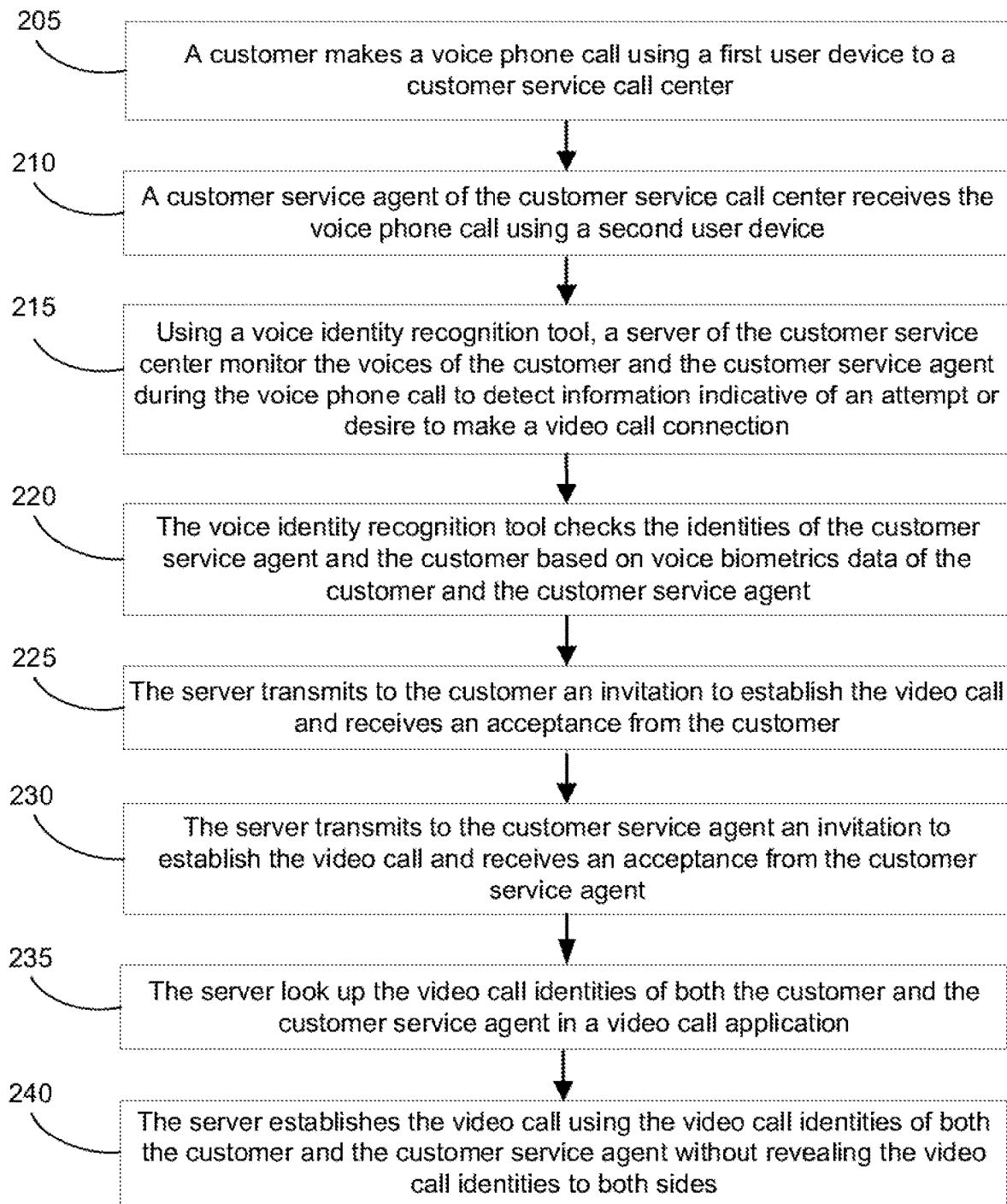
FIG. 2 is a diagram flow chart illustrating a method of providing a video call without revealing video call identifications of parties according to an example embodiment.

FIG. 2 illustrates a method 200 of providing a video call without revealing video call identifications of parties according to an example embodiment. FIG. 2 may reference the same or similar components as those illustrated in FIG. 1, including a first user device, a server, a database, and a second user device.

The method 200 may commence at block 205, where a user (e.g., a customer) makes a voice phone call using a first user device to a customer service call center. The customer service call center may hold a server that receives the voice phone call placed by the user. Upon receipt of the voice phone call, the customer service call center may be configured to assign the voice phone call to an available customer service agent and transfer the voice phone call to the customer service agent (block 210). The customer service agent may use a second user device (e.g., a desktop phone) to receive the voice phone call.

The server may include a voice identity recognition tool that is configured to monitor and listen to the voices of the customer and the customer service agent during the voice phone call. The voice identity recognition tool may employ NLP algorithms (e.g., speech recognition and speech segmentation) to monitor and analyze the voices of the customer and the customer service agent during the voice phone call for detecting information (block 215). The voice identity recognition tool may also employ other machine learning methods, for example recurrent neural networks, convolutional neural networks, and long-short term memory networks, to monitor and analyze the voices of the customer and the customer service agent during the voice phone call for detecting information. The information can be voice information indicative of an attempt or desire to make a video call connection between the customer and the customer service agent. Examples of the voice information include the customer or the customer service agent speaking, such as "I would like to show a picture of the damage to the desk", "I want to see your receipt", "let's make a video call", and so on. The information may also be text information extracted from text converted from the voice call by using speech-to-text algorithm. For example, the extracted text information may be "demonstrate the assembly process for you".

Upon detecting information indicative of an attempt to make a video call connection between the customer and the customer service agent, the server may authenticate the customer and the customer service agent. For example, in block 220, the voice identity recognition tool can authenticate the customer and the customer service agent by checking the identities of the customer service agent and the customer based on historical voice biometrics data of the customer and the customer service agent, which may be stored in the server or in a separate database in communication with the server. Details of authenticating based on the historical voice biometrics data will be described later.

In block 225, upon authenticating the customer and the customer service agent, the server may transmit to the customer an invitation to establish the video call. For example, the voice identity recognition tool may transmit a voice invitation using the phone signal line, saying like "would you like to make a video call connection to the customer service agent to facilitate solving your problem?"

Alternatively, the invitation may be a text invitation, such as "would you like to make a video call connection with the customer service agent? If yes, please click on the OK button". For example, the text invitation may be sent by the server to the first user device using a secure back channel or a front channel of the network 150 as described above in FIG. 1. Upon receiving the invitation to make the video call connection, the customer can present his/her acceptance. For example, in the case where the invitation is a voice invitation, the customer can say "Yes", "I agree" or "OK", and the customer's answer can be automatically received and analyzed by the voice identity recognition tool, for example using NLP to detect the acceptance from the customer. In the case where the invitation is a text invitation, the customer can type "OK", "Fine", and the like and send his/her answer to the server, or the customer may click on a "OK" or "agree" button, and the server can receive and confirm the acceptance from the customer.

Similarly, in block 230, upon authenticating the customer and the customer service agent, the server may transmit to the customer service agent an invitation to establish the video call. In addition, the customer service agent may use a third user device (e.g., a smart phone) to receive a text invitation when the second user device used by the customer service agent for the voice call is not capable of receiving text messages.

Upon getting the acceptance for connection from two sides, in block 235, the server may look up the video call identities or identifications of both the customer and the customer service agent in a video call application. The video call identity may be a user name, an email address, or a phone number associated with a user account of the video call application, which can be used to establish a video call through the video call application. The video call application used by the customer and the video call application used by the customer service agent may be the same video call application, may be different video call applications, may be a proprietary video call application, or may be a third party video call application. In this example, the video call application can be a proprietary video call application, so the server can be a host server of the video call application and is configured to be capable of searching and retrieving the video call identities of both the customer and the customer service agent in the video call application from the database (e.g., the database 130 in FIG. 1).

In block 240, the server establishes the video call using the video call identities of both the customer and the customer service agent without revealing the video call identities to both sides. The video call can be established using video signal channels. The customer service agent may use the third user device on which the video application is installed, to make and receive the video call when the second user device used for the voice call is not capable of making and receiving the video call.

The server uses the video call identities from two sides to make the connection on that video call application without revealing the video call identities to both sides and without requiring them to know each other to make the video call. That is, unlike existing video call technologies where people need to know each other's video call identities to establish a video call between them, the video call herein between the customer and the customer service agent can be established without revealing the video call identity of the customer to the customer service agent and without revealing the video call identity of the customer service agent to the customer. Both of the video call identities are only known by the server, and the customer and the customer service agent do not know each other's video call identities and are not required to be in a contact list or address book of each other to establish the video call connection.

The system disclosed herein can help customers and service call agents understand each other better using video calls without revealing their video call identities and without them in their friend lists of each other. This can increase the quality and satisfaction of the customer service.

In some embodiments, in addition to the video call identification of the customer being withheld from the customer service agent, there may have a granular flow of additional customer information that is revealed to the customer service agent as needed throughout the video call. Voice confirmation using the voice identity recognition tool can be employed to allow agents to access only allowed information. For example, the customer may allow the agent to see no information at all at the beginning of the video call, or may allow the agent to see general information (e.g., product name and manufacturer) at the beginning of the video call. As another example, when first talking to the customer, the agent does not have access to non-general information, such as private information (e.g., a customer's account number, a customer's payment method, a customer's shipping address). If during the video call the agent needs more information from the customer, the agent can ask for confirmation from the customer to view specific information. If confirmed by the customer, this confirmation is recognized by the voice identity recognition tool and the corresponding information is revealed to the agent without revealing other private information of the customer. The system can recognize specific items of information that the agent asks for (e.g., shipping address or payment method) and detect such request of the agent using the voice identity recognition tool. The system accordingly can then recognize the customer's answer and detect the customer's answer using the voice identity recognition tool.

In one example, the customer service agent may not need to know any additional information of the customer. For example, the customer buys a product and is unable to figure out how to assemble it. In this case, the customer service agent does not need to know account information of the customer for that. The customer service agent can just pull up the manual of the product and walk the customer through assembling the product on the video call. In another example, the customer service agent may gain additional information of the customer with or without permissions from the customer. For example, the customer wants to return a product, at that point the customer service agent may have to get into the customer's account (e.g., revealing only that purchase information to the agent) and verify the purchase so a return of the product can be arranged during the video call. In another example, once the video call connection is established, then the customer service agent can have immediate access to account information of the customer. In an example, NLP can be involved in making customer's account information available to the customer service agent on a need basis. For example, the customer's account information can be associated with the voice biometrics data of the customer, and the voice recognition tool can locate the customer's account information based on the voice biometrics data of the customer. Text-to-speech algorithm of NLP can be used to read using the voice recognition tool the customer's account information to the customer service agent.

Figure 3:
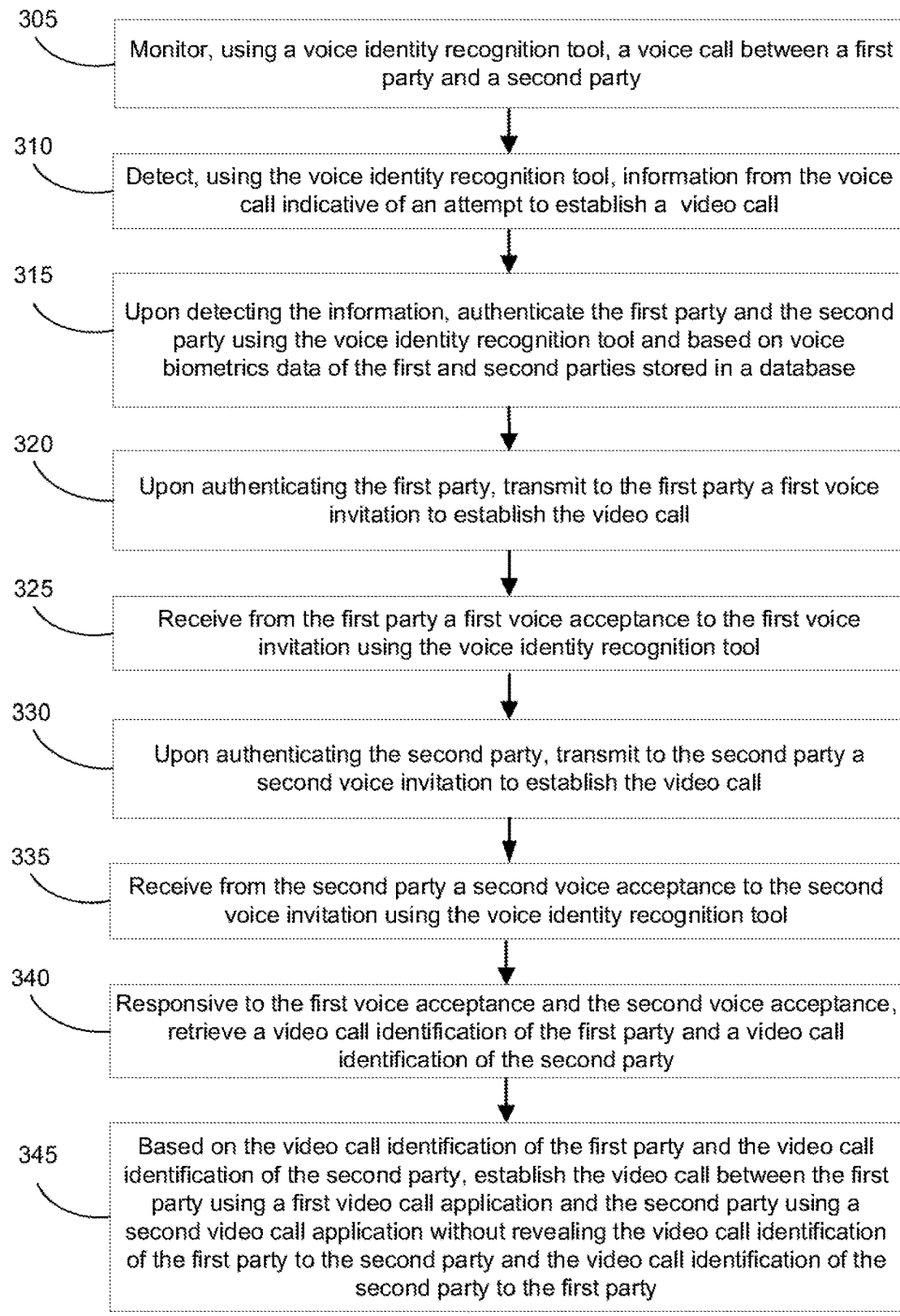
FIG. 3 is a flow chart illustrating a method of providing a video call without revealing video call identifications of parties according to an example embodiment.

FIG. 3 is a flow chart illustrating a method 300 of providing a video call without revealing video call identifications of parties according to an example embodiment.

FIG. 3 may reference the same or similar components as those illustrated in FIGS. 1 and 2, including a first user device, a server, a database, and a second user device. For example, the method 300 may be implemented in the system 100 shown in FIG. 1.

The method 300 may commence at block 305, where a voice identity recognition tool, which can be contained in a server, a user device, or other device, is used to monitor a voice call between a first party and a second party. For example, a customer as the first party may make a voice phone call to a customer service center, and the voice phone call may be received by a customer service agent as the second party. The voice call may be monitored by the voice identity recognition tool, for example using NLP as described above. The voice identity recognition tool may employ NLP algorithms (e.g., speech recognition and speech segmentation) to monitor and analyze the voices of the customer and the customer service agent during the voice phone call.

In block 310, the voice identity recognition tool in the server is configured to detect information from the voice call indicative of an attempt to establish a video call. The information may be voice information or text information as described in block 215 of FIG. 2. The attempt can be automatically detected and extracted from the voice call by the voice identity recognition tool, for example using a speech recognition algorithm of NLP. An example of the attempt can be that the first party says to the second party during the voice call "I would like to present some pictures to you". Additional examples and details can be referred back to the above description in block 215 of FIG. 2.

Upon detecting the information, in block 315, the voice identity recognition tool in the server is configured to automatically authenticate from the voice call the first party and the second party based on voice biometrics data of the first and second parties stored in a database. The authentication can be performed through a speaker verification algorithm of NLP. The speaker verification algorithm can use a person's voice as a unique identifier to authenticate that they are who they claim to be. A sample of their speech is recorded, against which that person's speech patterns are compared to see if there is a match between the person's voice and their voice sample. In this example, the voice biometrics data of the first and second parties are collected historically and stored in a database. For example, a customer as the first party may have called the customer service center one or more times previously, and the voice biometric data of the customer from those calls can be collected and stored in the database. Similarly, the voice biometrics data of the second party (e.g., a customer service agent) can be historically collected from past calls or sample voice recording of the second party and stored in the database. The voice biometrics data can comprise but not limited to voice pitch, voice accent, speaking style, voice volume magnitude, voice intonation, and speaking frequency.

The voice biometrics data of the first and second party may be processed to be associated with the first and second parties respectively. Recognition of the person speaking can be considered as a pattern recognition problem. Various technologies can be used to process and store the voice biometrics data including, but not limited to, speech frequency estimation, hidden Markov models, Gaussian mixture models, pattern matching algorithms, neural networks, matrix representation, vector quantization and decision trees, which may be referred to collectively as machine learning (ML) models.

In this example, the server may use any suitable ML models or algorithms to process and analyze the voice biometric data of the first and second party for authenticating the first and second parties. The various ML models may comprise supervised learning (e.g., classification and regression), unsupervised learning (e.g., pattern recolonization and cluster analysis), semi-supervised learning, reinforcement learning, self-learning, feature learning (e.g., sparse dictionary learning), associate rules and anomaly detection. The various ML models can utilize various neural network, such as convolutional neural networks ("CNNs") or recurrent neural networks ("RNNs"). A CNN can include one or more convolutional layers (e.g., often with a subsampling step) and then followed by one or more fully connected layers as in a standard multilayer neural network. CNNs can utilize local connections, and can have tied weights followed by some form of pooling which can result in translation invariant features. A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units.

For example, to authenticate the first and second parties, the server can be configured to process voice of the first party during the voice call by the voice identity recognition tool using NLP (e.g., speech recognition and speaker verification). The server can compare the processed voice of the first party to the voice biometric data stored in the database to identify the first party using a ML algorithm. Similarly, the server can process voice of the second party during the voice call using the NLP algorithm by the voice identity recognition tool. The server can compare, using the ML algorithm, the processed voice of the second party to the voice biometric data stored in the database to identify the second party.

In some embodiments, noise reduction algorithms may be employed to improve accuracy of identifying the first and second parties. This may reduce inaccuracy resulting from changes in behavioral attributes of the voice, for example, the historical voice biometric data may be obtained from one telephone and the current voice call may use another telephone.

In block 320, upon authenticating the first party, the server may automatically transmit, using the voice identity recognition tool, to the first party a first voice invitation to establish the video call. As described above in steps 225 and 230 of FIG. 1, the invitation can be a voice invitation or a text invitation. In this example, the voice identity recognition tool may transmit a voice invitation using the phone signal line, saying like "would you like to make a video call connection to the customer service agent to facilitate solving your problem?" For text invitation, the server may transmit a text invitation, such as "would you like to make a video call connection with the customer service agent? If yes, please click on the OK button". Further details can be referred back to the above description in steps 225 and 230 of FIG. 1.

In this example, in block 325, the server automatically receives, using the voice identity recognition tool, from the first party a first voice acceptance to the first voice invitation. Upon receiving the voice invitation, the first party may accept the voice invitation by, for example, saying "yes," "OK", "go ahead", or the like.

Similarly, in block 330, upon authenticating the second party, the server may automatically transmit, using the voice identity recognition tool, to the second party a second voice invitation to establish the video call. As in block 320, the invitation can be a voice invitation or a text invitation. In this example, the voice identity recognition tool may transmit a voice invitation using the phone signal line, saying like "would you like to make a video call connection to the customer?" For text invitation, the server may transmit a text invitation, such as "would you like to make a video call connection with the customer? If yes, please click on the OK button". Further details can be referred back to the above description in steps 225 and 230 of FIG. 1.

In this example, in block 335, the server automatically receives, using the voice identity recognition tool, from the second party a second voice acceptance to the second voice invitation. Upon receiving the voice invitation, the second party may accept the voice invitation by, for example, saying "yes," "OK", "go ahead", or the like.

In this example embodiment, the acceptance for video call connection from two sides can be done automatically based on the voice recognition tool and NLP tool to detect the above commands such as "OK", "yes", or the like.

In block 340, responsive to the first voice acceptance and the second voice acceptance, the server may retrieve a video call identifications of the first party and a video call identification of the second party, which are associated with a video call application. The video call identification may be a user name, an email address, or a phone number associated with a user account of the video call application, which can be used to establish the video call through the video call application. The video call application used by the first party and the video call application used by the second party may be the same video call application, may be different video call applications, may be a proprietary video call application, or may be a third party video call application. In this example, the video call application can be a proprietary video call application, so the server can be a host server of the video call application and is configured to be capable of searching and retrieving the video call identifications of both the first and second parties from the database (e.g., the database 130 in FIG. 1).

In block 345, based on the video call identification of the first party and the video call identification of the second party, the server can establish the video call between the first party using a first video call application and the second party using a second video call application, without revealing the video call identification of the first party to the second party and without revealing the video call identification of the second party to the first party. As described above in block 340, in this example, the first video call application and the second video call application are the same video call application. The embodiments where the first video call application and the second video call application are different video call applications or third-party video call applications, will be described later in this disclosure. The video call can be automatically established by the server using video signal channels to the first user device associated with the first party and the second user device associated with the second party.

Unlike conventional video call technologies where people need to know each other's video call identifications to establish a video call between them, the video call herein between the first party and the second party can be established without revealing the video call identification of the first party to the second party and without revealing the video call identification of the second party to the first party. Both of the video call identifications are only known by the server, and the first and second parties do not know each other's video call identifications and are not required being in friend list of each other to establish the video call connection.

Figure 4:
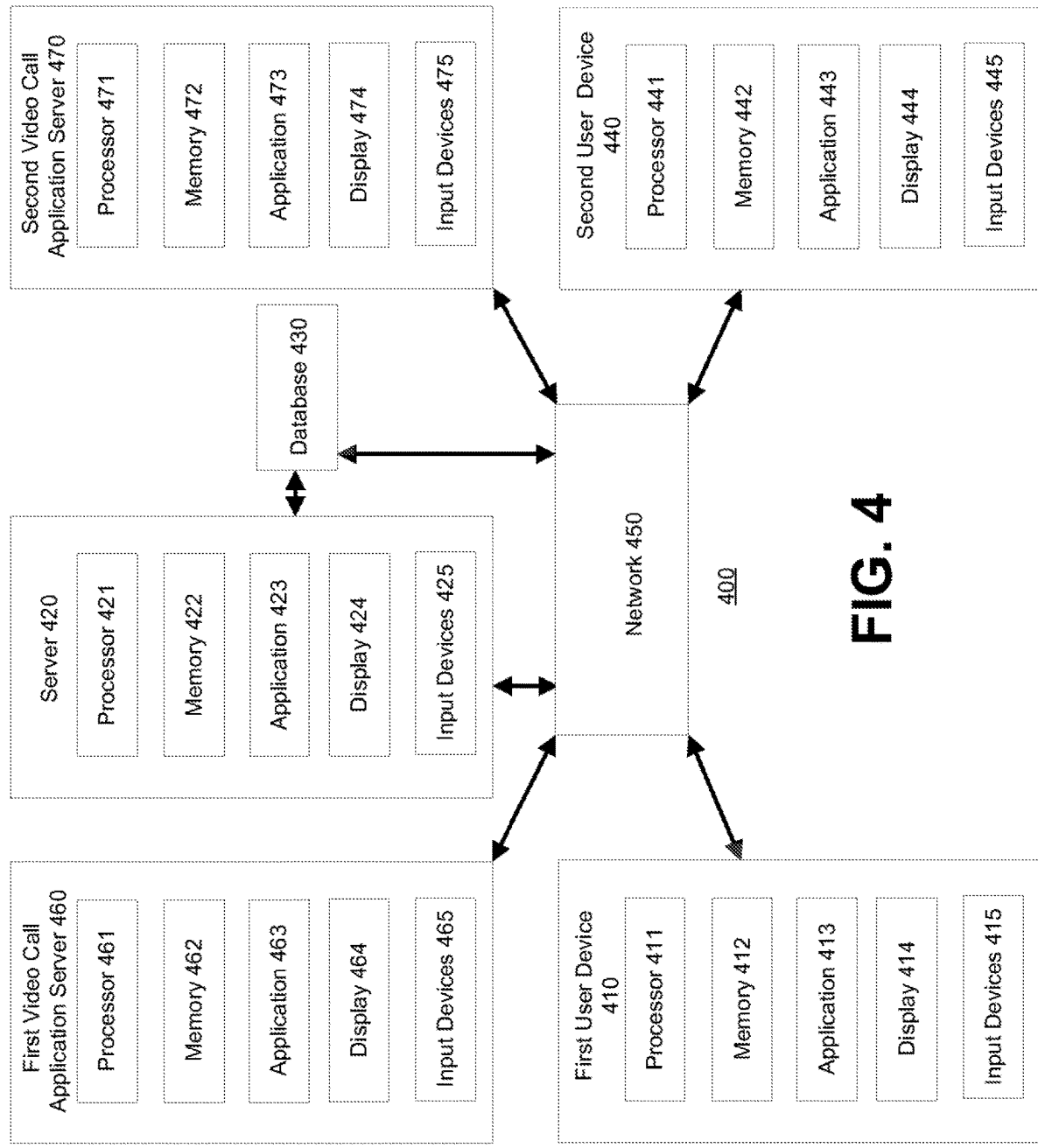
FIG. 4 is a diagram of a system for providing a video call without revealing video call identifications of parties according to an example embodiment.

FIG. 4 illustrates a diagram of a system 400 for providing a video call without revealing video call identifications of parties according to an example embodiment. FIG. 4 may reference the same or similar components as those illustrated in FIGS. 1-3. Although FIG. 4 illustrates single instances of the components, the system 400 may include any number of components.

As described above, the video call application used by the first party and the video call application used by the second party can be different or same third party video call applications. FIG. 4 illustrates the system 400 in which the video call application used by the first party and the video call application used by the second party are different third-party video call applications.

As shown in FIG. 4, the system 400 may comprise a first user device 410, a server 420, a database 430, a second user device 440, a network 450, a first video call application server 460, and a second video call application server 470.

The first user device 410, the server 420, the database 430, the second user device 440, and the network 450 are the same or substantially the same as the first user device 110, the server 120, the database 130, the second user device 140, and the network 150 in FIG. 1, respectively. For example, the first user device 410 may comprise a processor 411, a memory 412, one or more applications 413, a display 414, and one or more input devices 415. The sever 420 may comprise a processor 421, a memory 422, one or more applications 423, a display 424, and one or more input devices 425. The second user device 440 may comprise a processor 441, a memory 442, one or more applications 443, a display 444, and one or more input devices 445. Each of these components may be the same as the respective components described with reference to FIG. 1-3.

FIG. 4 further illustrates a first video call application server 460 and a second video call application server 470, each of which may be a network-enabled computer device. The first video call application server 460 and the second video call application server 470 are the same or substantially same as the server 120 in FIG. 1. For example, the first video call application server 460 and the second video call application server 470 may comprise a processor 461 and 471, a memory 462 and 472, one or more applications 463 and 473, a display 464 and 474, and one or more input devices 465 and 475, respectively. The components of the first video call application server 460 and the second video call application server 470 may function in the same manner as the components of the server 120 of FIG. 1 that have been previously described.

The first video call application server 460 may be a host server of the first video call application used by the first party. The video call identification of the first party may be a user account associated with the first video call application, and may be stored in the first video call application server 460 or a database in data communication with the first video call application server 460. The video call identification of the first party may comprise a user name, a user password, a telephone number, an email address, a social network account, or the like.

The second video call application server 470 may be a host server of the second video call application used by the second party. The video call identification of the second party may be a user account associated with the second video call application, and may be stored in the second video call application server 470 or a database in data communication with the second video call application server 470. The video call identification of the second party may comprise a user name, a user password, a telephone number, an email address, a social network account, or the like.

The first video call application server 460 and the second video call application server 470 may each be in data communication with the server 420 using a secure back channel or a front channel of the network 450. For example, the server 420 may comprise a first application programming interface (API) and a second API. The server 420 is configured to communicate, using the first API, to the first application server 460 associated with the first video call application to retrieve the video call identification of the first party. Similarly, the server 420 is configured to communicate, using the second API, to the second application server 470 associated with the second video call application to retrieve the video call identification of the second party.

Figure 5A:
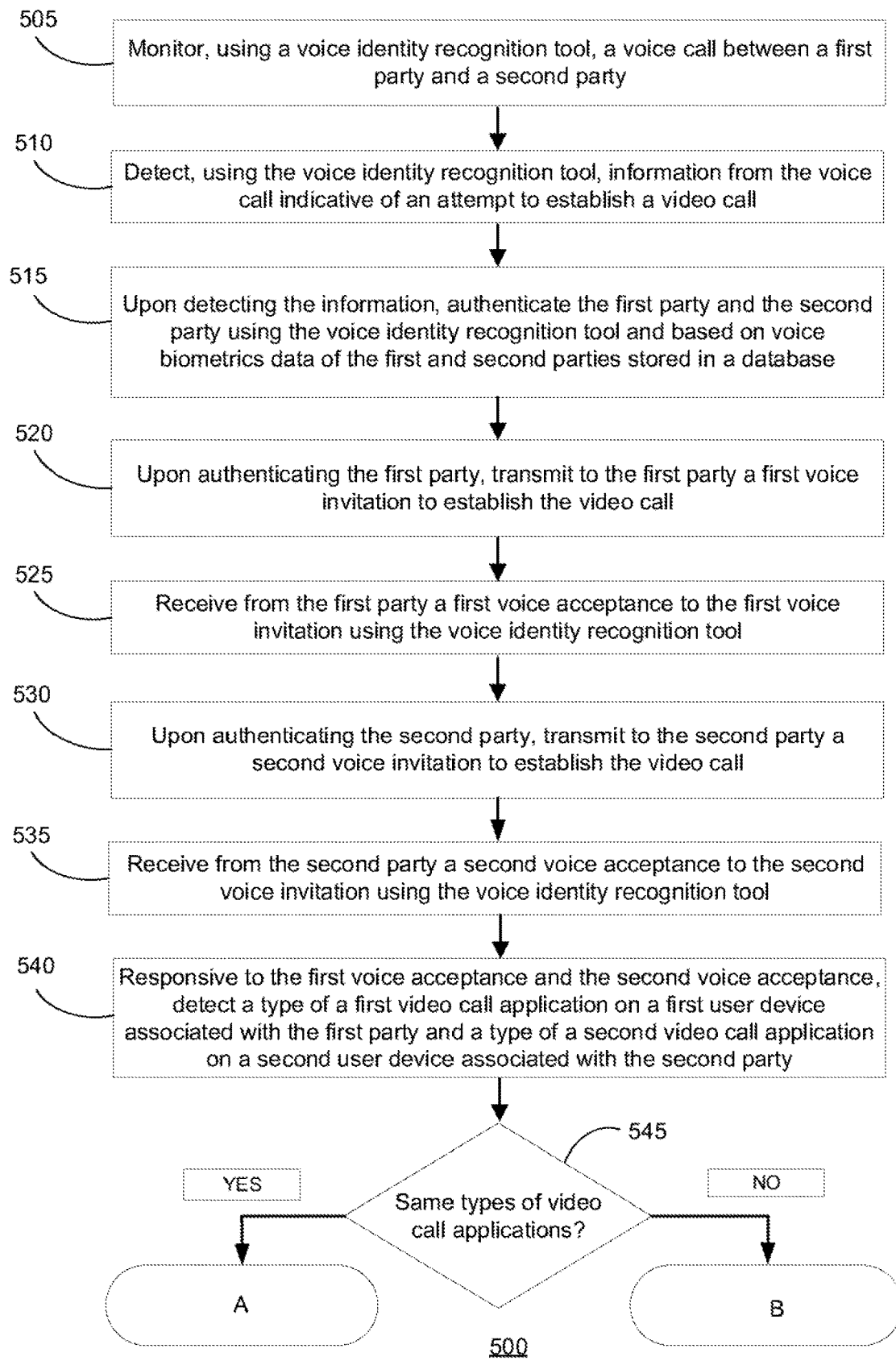
FIGS. 5A and 5B are a flow chart illustrating a method of providing a video call without revealing video call identifications of parties according to an example embodiment.
Figure 5B:
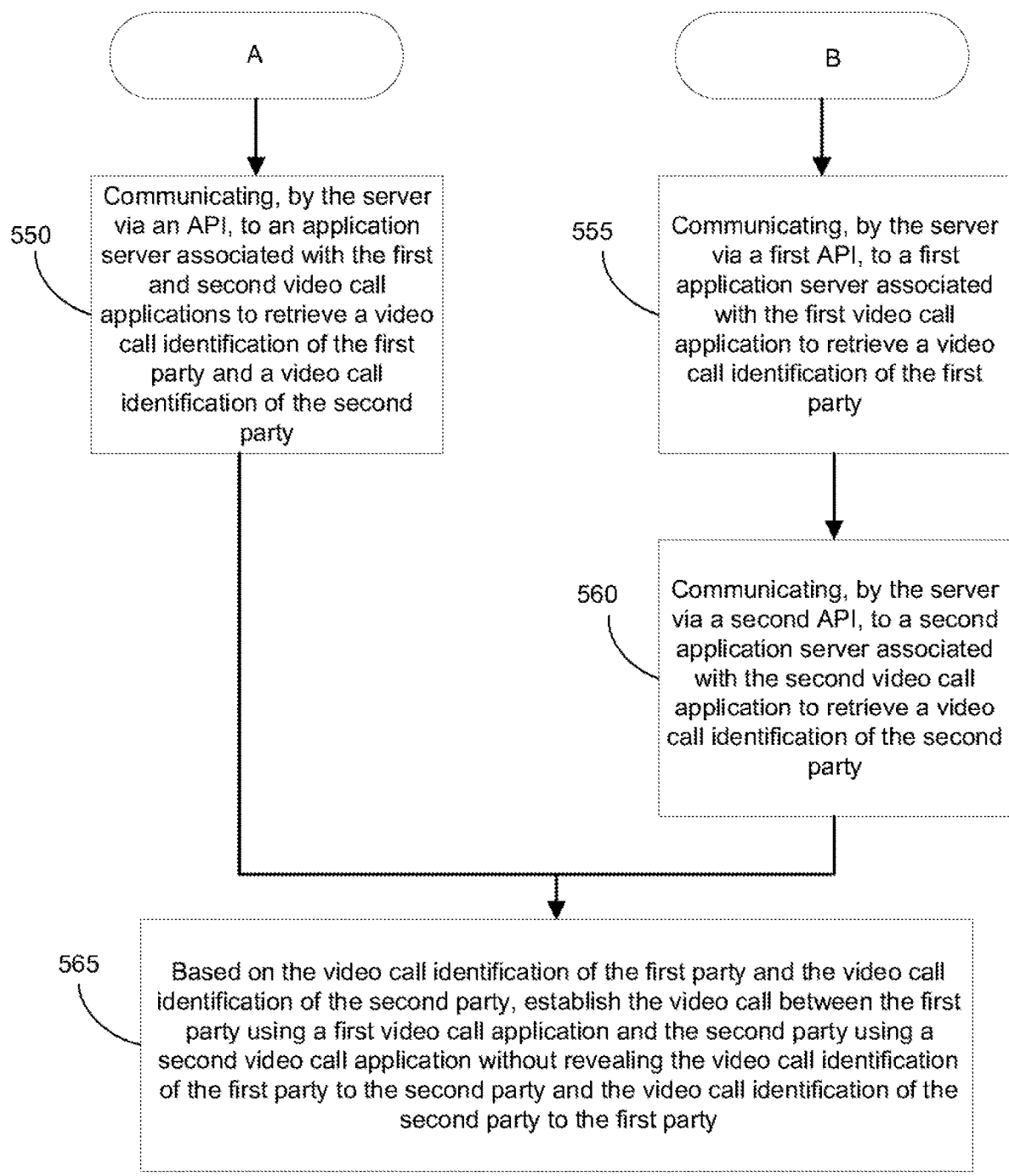

FIGS. 5A and 5B are a flow chart illustrating a method 500 of providing a video call between a first party and a second party without revealing video call identifications of both parties according to an example embodiment. FIGS. 5A and 5B may reference the same or similar components as those illustrated in FIGS. 1-4, including a first user device, a server, a database, a second user device, a first video call application server, and a second video call application server. For example, the method 500 may be entirely or partially implemented in the system 400 of FIG. 4.

The method 500 may commence at block 505. In block 505, the server monitors, using a voice identity recognition tool in the server, a voice call between a first party and a second party. In block 510, the server detects, using the voice identity recognition tool in the server, information from the voice call indicative of an attempt to establish a video call. In block 515, upon detecting the information, the server authenticates the first party and the second party from the voice call, using the voice identity recognition tool in the server and based on voice biometrics data of the first and second parties stored in a database. In block 520, upon authenticating the first party, the server transmits, using the voice identity recognition tool in the server, to the first party a first voice invitation to establish the video call. In block 525, the server receives from the first party, using the voice identity recognition tool in the server, a first voice acceptance to the first voice invitation. In block 530, upon authenticating the second party, the server transmits, using the voice identity recognition tool in the server, to the second party a second voice invitation to establish the video call. In block 535, the server receives from the second party, using the voice identity recognition tool in the server, a second voice acceptance to the second voice invitation. In some examples, blocks 505, 510, 515, 520, 525, 530, and 535 may be the same or substantially same as blocks 305, 310, 315, 320, 325, 330, and 335 in FIG. 3, respectively.

In block 540, responsive to the first voice acceptance and the second voice acceptance, the server is configured to detect a type of the first video call application on the first user device associated with the first party and a type of the second video call application on the second user device associated with the second party. In one example, the system can store the information of the customers and agents on these video call applications to the database when they first login to these video call applications. The system can dynamically update the information of both the customers and agents based on historical data from previous phone calls, including telephonic calls as well as calls made using the video call applications. For example, the first video call application may be detected to be FaceTime® on an iPhone®, and the second video call application may be detected to be a video call application running on an Android® phone.

In block 545, the server determines whether the type of the first video call application is the same type as the type of the second video call application. If they are the same type of video call application, a "YES" branch is selected and the process will proceed to block A. If they are different video call applications, a "NO" branch is selected and the process will proceed to block B.

Following block A, in block 550, the server may communicate, using an API, to an application server associated with the first and second video call applications to retrieve a video call identification of the first party and a video call identification of the second party. The same type of video call application can be any third-party video call application. For example, both the first party and the second party can use FaceTime® of iPhone® for the video call. In this case, the server can communicate to the FaceTime® server that may be hosted by Apple® to retrieve the video call identification of the first party and the video call identification of the second party.

Following block B, in block 555, the server may communicate, using a first API, to a first application server associated with the first video call application to retrieve a video call identification of the first party. For example, the first video call application may be an Android-based video call application. In this case, the server can communicate to the Android-based video call application server that may be hosted by a corresponding entity to retrieve the video call identification of the first party.

In block 560, the server may communicate, using a second API, to a second application server associated with the second video call application to retrieve a video call identification of the second party. For example, the second video call application may be FaceTime® of iPhone® for the video call. In this case, the server can communicate to the FaceTime® server that may be hosted by Apple® to retrieve the video call identification of the second party.

The process ends at block 565. In block 565, based on the video call identification of the first party and the video call identification of the second party, the server establishes the video call between the first party using the first video call application and the second party using the second video call application. The video call is established without revealing the video call identification of the first party to the second party and without revealing the video call identification of the second party to the first party. In such way, the private information of both the first party and the second party can be protected, which may include email address, telephone number, video call identification, home and work address, and so on.

Figure 6:
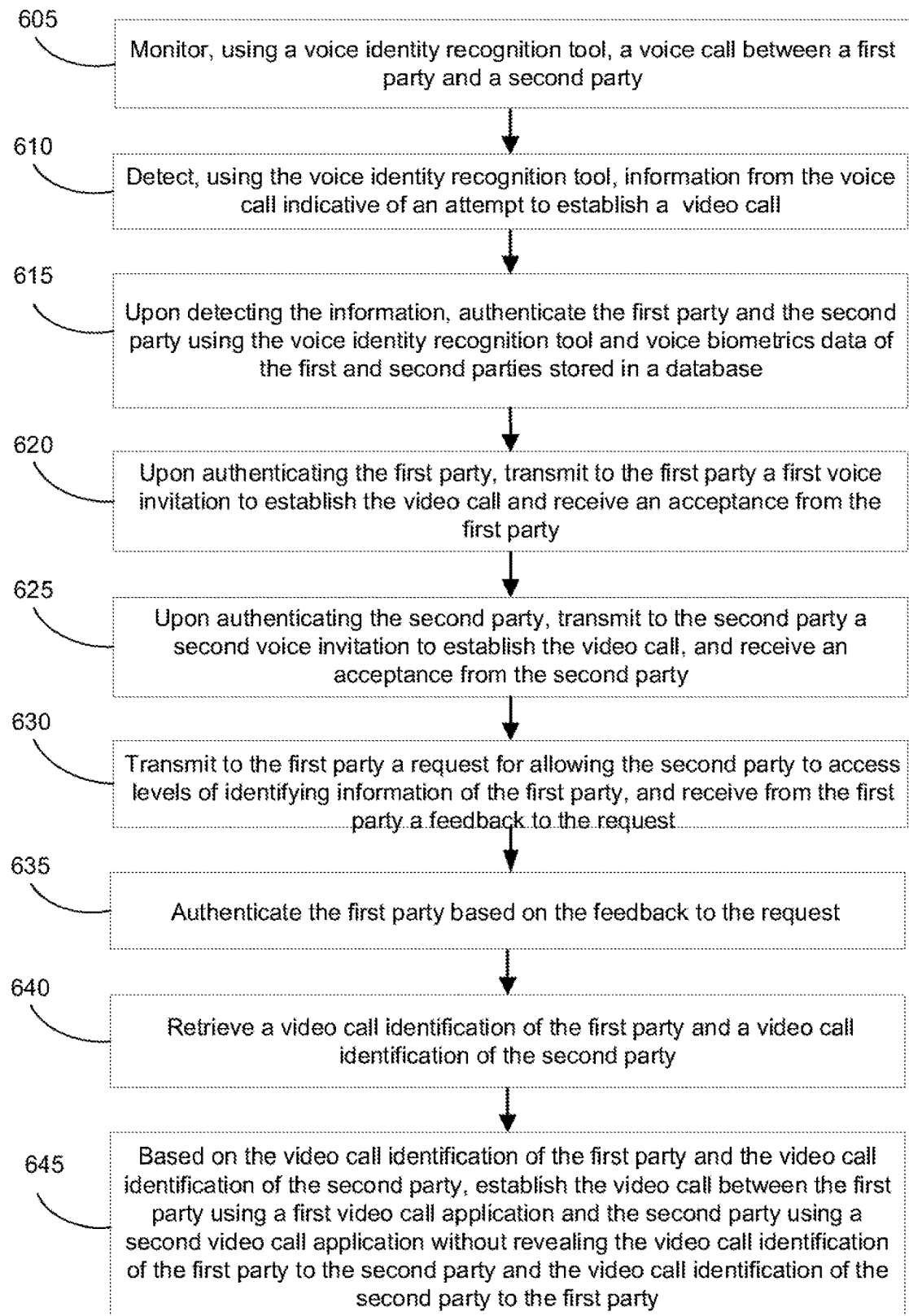
FIG. 6 is a flow chart illustrating a method of providing a video call without revealing video call identifications of parties according to an example embodiment.

FIG. 6 is a flow chart illustrating a method 600 of providing a video call between a first party and a second party without revealing video call identifications of both parties according to an example embodiment. FIG. 6 may reference the same or similar components as those illustrated in FIGS. 1-5, including a first user device, a server, a database, and a second user device. For example, the method 600 may be entirely or partially implemented in the system 100 of FIG. 1 and/or the system 400 of FIG. 4.

The method 600 may commence at block 605. In block 605, the server monitors, using a voice identity recognition tool in the server, a voice call between a first party (e.g., a customer calling a customer service center) and a second party (e.g., a customer service agent of the customer service center). In block 610, the server detects, using the voice identity recognition tool in the server, information from the voice call indicative of an attempt to establish a video call. In block 615, upon detecting the information, the server authenticates the first party and the second party from the voice call, using the voice identity recognition tool in the server and based on voice biometrics data of the first and second parties stored in a database. In block 620, upon authenticating the first party, the server transmits, using the voice identity recognition tool in the server, to the first party a first voice invitation to establish the video call, and receives an acceptance to the first voice invitation from the fist party. In block 625, upon authenticating the second party, the server transmits, using the voice identity recognition tool in the server, to the second party a second voice invitation to establish the video call, and receives an acceptance to the second voice invitation from the second party. In some examples, the blocks 605, 610, 615, 620, and 625 may be the same or substantially the same as blocks 505, 510, 515, 520, 525, 530, and 535 in FIG. 5A and/or blocks 305, 310, 315, 320, 325, 330, and 335 in FIG. 3.

In some embodiments, the second party may need to know more information regarding the first party. For example, there can be a granular flow of additional customer information that needs to be revealed to the customer service agent as needed throughout the video call. In an example, the customer service agent may need to gain additional information of the customer with permission from the customer. For example, if the customer wants to return a product, at that point the customer service agent may have to access the customer's account (e.g., revealing only that purchase information to the agent) and verify the purchase so a return of the product can be arranged during the video call. In another example, once the video call connection is established, then the customer service agent may be allowed to have immediate access to account information of the customer. In such embodiments, in block 630, the server may transmit to the first party a request for allowing the second party to access levels of identifying information of the first party. The levels of identifying information of the first party may include, but not limited to, basic account information (e.g., shipping address and order history) and additional higher-level information (e.g., financial account information for a refund). The request can be voice request using the voice identity tool, such as "would you like the customer service agent to access your financial account information for a refund?" The request may also a prompt displayed on the user device used by the first party, such as "would you like the customer service agent to access your financial account information for a refund? If yes, please click OK, if no, please click NO".

The server may receive from the fist party a feedback to the request. For example, if the request is a voice request, the server may receive a verbal feedback using the voice identity tool from the first party. Alternatively, if the request is a prompt displayed on the user device, the server may receive a text feedback using a front channel or a secure back channel from the first party.

In block 635, the server may authenticate the first party based on the feedback to the request. For example, if the customer allows the customer service agent to access levels of identifying information of the customer, the server may ask the customer to provide a credential for verification. For example, the customer may be required to provide an email address or a user name of the financial account. In an example, NLP can be involved in making customer's account information available to the customer service agent on a need basis. For example, the customer's account information can be associated with the voice biometrics data of the customer, and the voice recognition tool can locate the customer's account information based on the voice biometrics data of the customer. Text-to-speech algorithm of NLP can be used to read using the voice recognition tool the customer's account information to the customer service agent. In some embodiments, a multifactor authentication may be used. For example, in addition to the email address of the customer, the customer may be asked one or more security questions for verifying the financial account of the customer. Similarly, the customer service agent may also be authenticated to access the levels of identifying information of the customer.

In block 640, responsive to the first voice acceptance and the second voice acceptance, the server may retrieve a video call identifications of the first party and a video call identification of the second party, which are associated with a video call application.

In block 645, based on the video call identification of the first party and the video call identification of the second party, the server can establish the video call between the first party using a first video call application and the second party using a second video call application, without revealing the video call identification of the first party to the second party and without revealing the video call identification of the second party to the first party. The video call can be automatically established by the server using video signal channels to the first user device associated with the first party and the second user device associated with the second party.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of providing a video call between a first party associated with a first video call identification and a second party associated with a second video call identification, comprising:
   receiving from the first party, using a voice identity recognition tool, a first voice acceptance to a first voice invitation;
   receiving from the second party, using the voice identity recognition tool, a second voice acceptance to a second voice invitation;
   responsive to the first voice acceptance, communicating, using a first application programming interface (API) of a server, to a first application server associated with a first video call application to retrieve the first video call identification;
   responsive to the second voice acceptance, communicating, using a second API of the server, to a second application server associated with a second video call application to retrieve the second video call identification;
   establishing, based on the first video call identification and the second video call identification, the video call between the first party and the second party using the first video call application;
   requesting input of a credential from the first party; and
   upon input of the credential, transmitting to the first party a request for allowing the second party to access a level of identifying information of the first party.

2. The method of claim 1, further comprising, prior to receiving the first voice acceptance and the second voice acceptance:
   monitoring, using the voice identity recognition tool of a server, a voice call between the first party and the second party;
   detecting, using the voice identity recognition tool, voice information from the voice call indicative of an attempt to establish the video call; and
   upon detecting the voice information, authenticating from the voice call, using the voice identity recognition tool and based on voice biometrics data of the first and second parties stored in a database, the first party and the second party.

3. The method of claim 2, wherein:
   the voice biometrics data comprise at least one selected from a group of voice pitch, voice accent, voice intonation, speaking style, voice volume magnitude, and speaking frequency, and
   the voice biometrics data are respectively associated with the first and second parties through a machine learning algorithm.

4. The method of claim 2, further comprising, upon authenticating the first and second parties:
   transmitting, using the voice identity recognition tool, to the first party the first voice invitation to establish the video call, and
   transmitting, using the voice identity recognition tool, to the second party the second voice invitation to establish the video call.

5. The method of claim 2, wherein, during the authentication of the first party and the second party, the method further comprises:
   processing, using a natural language processing algorithm by the voice identity recognition tool, voice of the first party during the voice call; and
   comparing, using a machine learning algorithm, the processed voice of the first party to the voice biometric data to identify the first party.

6. The method of claim 1, further comprising:
   requesting input of feedback from the first party; and
   upon input of the feedback from the first party, further authenticating the first party based on the feedback.

7. The method of claim 6, wherein the feedback comprises at least one selected from the group of a verbal feedback and a text feedback.

8. The method of claim 1, wherein the first video call application is a different video call application than the second video call application.

9. The method of claim 1, wherein the video call is established without revealing the first video call identification to the second party and the second video call identification to the first party.

10. The method of claim 1, wherein:
    the first video call application is on a first user device associated with the first party, and the first video call identification is a video call account associated with the first video call application, and
    the second video call application is on a second user device associated with the second party, and the second video call identification is a video call account associated with the second video call application.

11. The method of claim 1, wherein the voice information from the voice call is detected using the voice identity recognition tool using a speech recognition algorithm.

12. A system for providing a video call between a first party and a second party, comprising:

a server; and a database storing voice biometrics data of the first party and the second party; and a voice identity recognition tool, wherein the server is configured to:
- receive from the first party a first voice acceptance to a first voice invitation;
- receive from the second party a second voice acceptance to a second voice invitation;
- responsive to the first voice acceptance, communicate, using the first application programming interface (API), to a first application server associated with a first video call application to retrieve a first video call identification;
- responsive to the second voice acceptance, communicate, using the second API, to a second application server associated with a second video call application to retrieve a second video call identification;
- establish, based on the first video call identification and the second video call identification, the video call between the first party using the first video call application and the second party using the second video call application;
- request input of a credential from the first party; and
- upon input of the credential, transmit to the first party a request for allowing the second party to access a level of identifying information of the first party.

13. The system of claim 12, wherein the server is further configured to, prior to receiving the first voice acceptance and the second voice acceptance:
- monitor a voice call between the first party and the second party,
- detect, using the voice identity recognition tool, voice information from the voice call indicative of an attempt to establish the video call, and
- upon detecting the voice information, authenticate using the voice identity recognition tool and based on the voice biometrics data, the first party and the second party.

14. The system of claim 13, wherein the server is further configured to, upon authenticating the first and second parties:
- transmit to the first party the first voice invitation to establish the video call, and
- transmit to the second party the second voice invitation to establish the video call.

15. The system of claim 12, wherein the server is further configured to establish the video call without revealing the first video call identification to the second party and without revealing the second video call identification to the first party.

16. The system of claim 12, wherein the first video call application is a different video call application than the second video call application.

17. The system of claim 12, wherein the server is further configured to:
- request input of feedback from the first party, and
- upon input of the feedback from the first party, further authenticate the first party based on the feedback.

18. A non-transitory computer-accessible medium having stored thereon computer-executable instructions for providing a video call between a first party associated with a first video call identification and a second party associated with a second video call identification, wherein the computer arrangement is configured to perform procedures comprising:
- receiving from the first party, using a voice identity recognition tool, a first voice acceptance to a first voice invitation;
- receiving from the second party, using the voice identity recognition tool, a second voice acceptance to a second voice invitation;
- responsive to the first voice acceptance, communicating, using a first application programming interface (API) of the server, to a first application server associated with a first video call application to retrieve the first video call identification;
- responsive to the second voice acceptance, communicating, using a second API of the server, to a second application server associated with a second video call application to retrieve the second video call identification; and
- establishing, based on the first video call identification and the second video call identification, the video call between the first party and the second party using the first video call application and requesting input of a credential from the first party; and
- upon input of the credential, transmitting to the first party a request for allowing the second party to access a level of identifying information of the first party.

19. The non-transitory computer-accessible medium of claim 18, wherein:
- the server is further configured to establish the video call without revealing the first video call identification to the second party and without revealing the second video call identification to the first party, and
- the first video call application is a different video call application than the second video call application.

20. The non-transitory computer-accessible medium of claim 18, wherein the procedures further comprise:
- requesting input of feedback from the first party, and
- upon input of the feedback from the first party, further authenticating the first party based on the feedback.

* * * * *